July 9, 1946.  J. ASHURST  2,403,840
QUEEN BEE SHIPPING AND INTRODUCING CAGE
Filed April 10, 1944
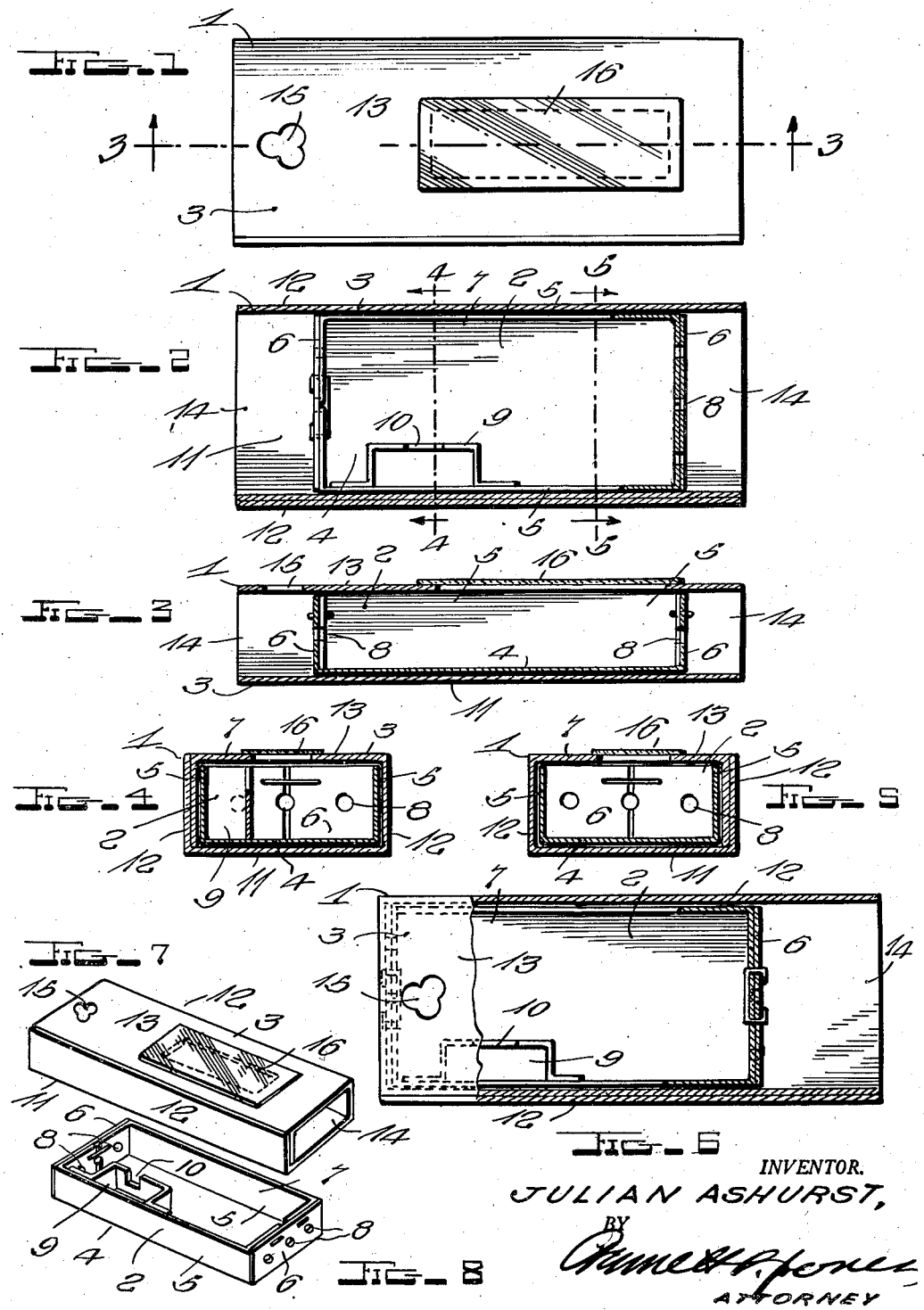
INVENTOR.
JULIAN ASHURST,
BY
ATTORNEY Patented July 9, 1946

2,403,840

UNITED STATES PATENT OFFICE 2,403,840

QUEEN BEE SHIPPING AND INTRODUCING CAGE

Julian Ashurst, Westmoreland, Calif.

Application April 10, 1944, Serial No. 530,333

5 Claims. (Cl. 6—9)

This invention relates to a queen bee shipping and introducing cage, and has particular reference to cages of that type adapted to be transmitted from consignor to consignee through ordinary mails.

One object of the invention is to provide a simple and inexpensive cage of this character by which bees may be safely confined and shipped.

Another object of the invention is to provide a cage comprising an inner receptacle and a cover therefor through which the bees may be introduced into the cage and therein confined by relative shifting movements of the inner receptacle and cover, and which cover is adapted to permit ready insertion and removal of the cage while holding the cage securely against displacement during shipment.

Still another object of the invention is to provide a cage having an inner receptacle provided with an open side normally closed by the cover during shipment, which receptacle is adapted in an introducing action to be embedded in a hive comb to confine the bees during an introducing period.

Still another object of the invention is to provide an inner cage receptacle which is made of a material which when applied to the comb may be gnawed away by the bees and thus disposed of, during which period of disposal the queen bee is gradually introduced so as to be favorably received by the bees of the hive.

The invention consists of the novel features of construction, combination and arrangement of parts, hereinafter fully described and claimed, and as shown in the accompanying drawing, in which:

Fig. 1 is a front view of the cage with the inner receptacle disposed in the cover for shipment.

Fig. 2 is a sectional plan view through the cover showing the inner receptacle partly in section.

Fig. 3 is a vertical longitudinal section on the line 3—3 of Fig. 1.

Figs. 4 and 5 are transverse sections taken, respectively, on the lines 4—4 and 5—5 of Fig. 2.

Fig. 6 is a front view of the cover, partly broken away and in section and the inner receptacle partly in plan and partly in section, showing the inner receptacle in position to receive a bee inserted through the insertion opening in the cover.

Figs. 7 and 8 are perspective views respectively of the cover and inner receptacle separated from each other.

Referring more particularly to the drawing, 1 designates the cage which comprises an oblong rectangular inner receptacle 2 and an oblong rectangular outer receptacle or cover 3.

The inner receptacle 2 embodies in its construction a bottom or back wall 4, side walls 5, and end walls 6, and is open or devoid of a wall at its top or front side 7. The walls 6 are provided with suitably formed ventilation openings 8, and within the receptacle is arranged a food holding cell or chamber 9 in which suitable food may be placed to supply the bees during a shipping period. The cell or chamber 9 may be formed of a strip of material bent into shape and secured to and forming with one of the walls 5 a chamber of a desired form and size. This chamber may be open at the top to allow the food to be readily introduced therein and it is provided in its inner wall with an opening 10 allowing the bees to pass in and out and have access to the food.

The outer receptacle 3 embodies in its construction a bottom or back wall 11, side walls 12 and a front or top wall 13, the said receptacle being of greater length than the inner receptacle 2 and being open at each end 14 for the insertion therein and removal therefrom of the inner receptacle.

The receptacle 2 is adapted to fit with sufficient snugness in the receptacle 3 so that it will be held therein against casual displacement while allowing it to be readily forced outward and removed when desired. The receptacle 2 is designed to hold the queen and other bees to be shipped, and the receptacle 3 serves as a cover to close it against escape of the bees and to protect said receptacle 2 and its contents during shipment. The receptacle 3 is of such greater length than the receptacle 2 that when the receptacle 2 is disposed in proper shipping position in the receptacle 3, as shown clearly in Figs. 2 and 3, the ends of the latter will project beyond the ends of the former to form guards to protect the ends of the receptacle 2 from liability of injury due to contact with extraneous objects in shipment.

When the receptacle 2 is properly disposed in the receptacle 3, the open top 7 of the receptacle 2 and the open top of the chamber 9 will be closed by the wall 13 of the receptacle 3 against escape of the bees, leaving exposed only the ventilation openings 8 which are too small for passage of the bees. The receptacle 2 will also be spaced equally from the ends 14 of the receptacle 3 and the open side 7 of the receptacle 2 will lie out of registry with an opening 15 formed in the wall 13 adjacent one of the ends 14 of the receptacle 3. When the receptacle 2 is fitted in the receptacle 3 it may be moved to bring its open top 7 into registry with the opening 15 to allow the bees to be inserted through the opening 15, after which the receptacle 2 is shifted to the position shown in Figs. 2 and 3 in which it lies inwardly of the opening 15 and is closed against escape of the bees.

The front wall 13 of the receptacle 3 may be provided with an opening covered by a sheet of transparent material 16 forming a panel or window through which the interior of the receptacle 2 may be viewed at all times in order that the condition of the bees may be determined. This wall 13 or the wall 11 may serve as an address side to receive the addresses of the consignor and consignee as well as stamps for prepayment of postage and either wall 11 or 13 may bear a label or printed matter giving instructions for the care of the bees during shipment and such other informatory matter as the consignor may desire to place thereon.

When the bees reach their destination and it is desired to hive them, the receptacle 2 is withdrawn from the receptacle 3 and its open side 7 is pressed down or embedded into a surface of a comb in the hive. The delivered bees are thus placed in position to form a hive swarm and to introduce a queen bee shipped in the cage to the other bees of the swarm.

In practice the parts of the cage may be formed of cardboard or other relatively cheap material. It is designed to form the inner receptacle at least of such material or a like material which may be disintegrated or gnawed away by the bees and the particles carried off by them. By this means the receptacle 2 will be disposed of without the necessity of the hiveman removing it, as is necessary with cages made of wood or metal, and at the same time while the bees are thus disposing of the receptacle they are gradually introduced to the queen bee so that they will accept her as their queen. The described construction of the receptacle 2 secures these desirable advantages.

From the foregoing description, taken in connection with the drawing, the construction, mode of use and advantages of my improved shipping cage will be readily understood without a further and extended description. While the construction disclosed is preferred, it is to be understood that such construction is merely exemplificative and that changes in the form, proportion and arrangement of the parts, falling within the scope of the appended claims, may be made without departing from the spirit or sacrificing any of the advantages of the invention.

Having thus described my invention, I claim:

1. A bee shipping cage comprising an inner receptacle open at one side and an outer receptacle open at each end and adapted to close the open side of the inner receptacle when the latter is fitted therein, said outer receptacle being of greater length than the inner receptacle and adapted to snugly receive the same and having adjacent to one end thereof a bee insertion opening adapted to be disposed into or out of register with the open side of the inner receptacle by relative sliding movements of said receptacles.

2. A bee shipping case comprising an inner receptacle open at one side and an outer receptacle of greater length than the inner receptacle and open at each end and adapted to close the open side of the inner receptacle when the latter is fitted therein, said outer receptacle being provided with a bee insertion opening in one of its walls and said inner receptacle being longitudinally shiftable within the outer receptacle to bring its open side into and out of registry with said opening.

3. A bee shipping case comprising an inner receptacle open at one side and an outer receptacle of greater length than the inner receptacle and open at each end and adapted to close the open side of the inner receptacle when the latter is fitted therein, said outer receptacle being provided with a bee insertion opening in one of its walls and said inner receptacle being provided with a food holding chamber and being longitudinally shiftable within the outer receptacle to bring its open side into and out of registry with said opening.

4. A bee shipping cage comprising an outer receptacle and an inner receptacle adapted to be fitted into the outer receptacle and removed therefrom, the outer receptacle being of greater length than the inner receptacle and being provided adjacent to one end thereof with a bee insertion opening adapted to be disposed into and out of register with the open side of the inner receptacle by relative sliding movements of said receptacles, said inner receptacle having an open side closed by the outer receptacle when fitted therein and adapting it when removed from the outer receptacle to be embedded within a surface of a hive comb and closed thereby, and said inner receptacle being formed as a whole of a disintegrable material adapted to be readily gnawed away by bees confined between the same and the comb.

5. A bee shipping cage comprising an oblong rectangular inner receptacle open at one side and having food holding means therein and being formed of a material readily disintegrable by the gnawing action of bees, and an oblong rectangular outer receptacle of greater length than the inner receptacle and open at each end, said outer receptacle being adapted to hold frictionally the inner receptacle confined therein and from displacement therefrom and being provided in one of its walls with a bee insertion opening adapted by sliding motion of the inner receptacle to be moved into and out of register with the open side of the inner receptacle.

JULIAN ASHURST.